June 6, 1950          E. PAYNE          2,510,192
TIRE RELIEF VALVE
Filed Dec. 29, 1945
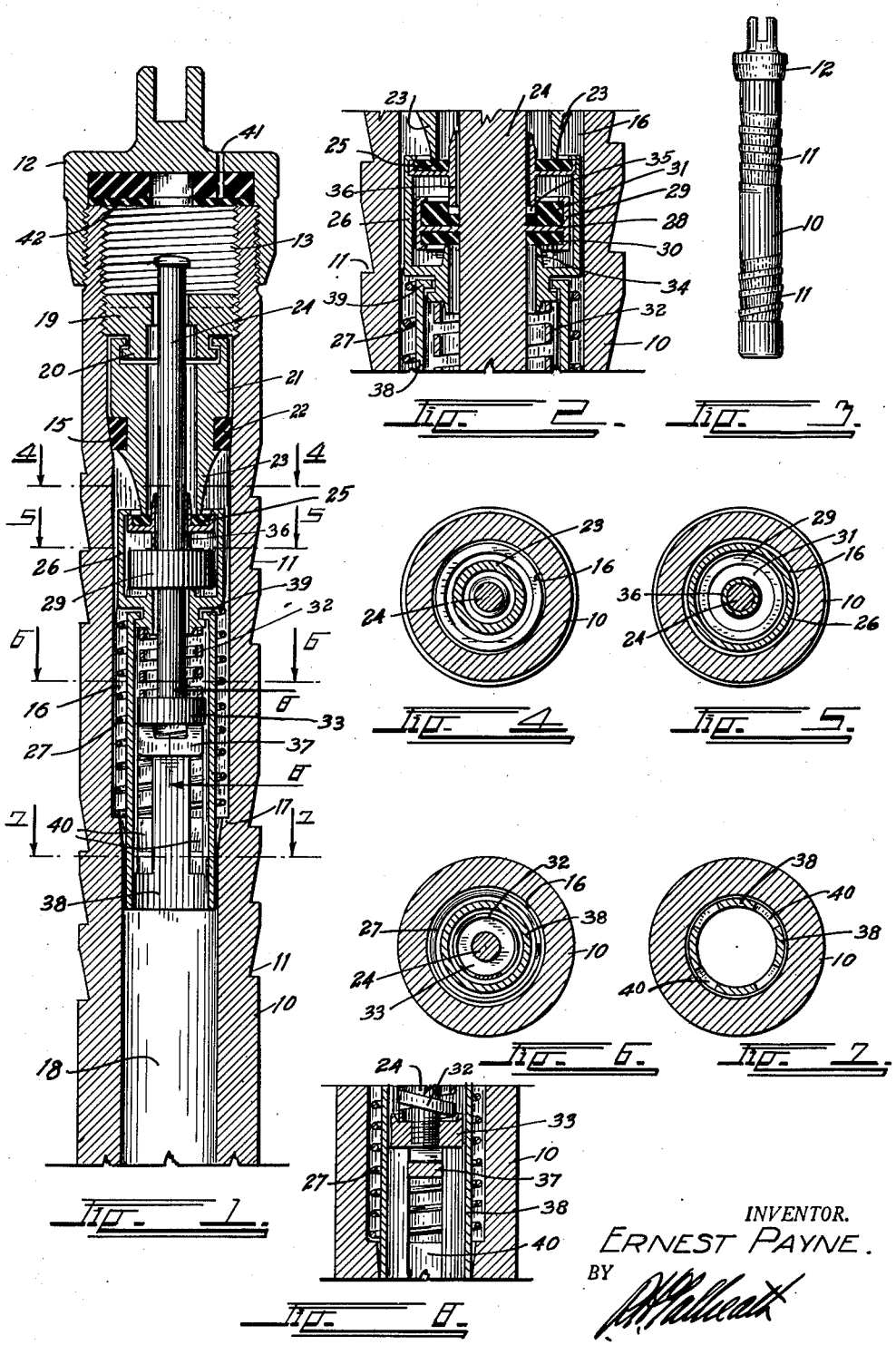
INVENTOR.
ERNEST PAYNE.
BY
ATTORNEY.

Patented June 6, 1950

2,510,192

UNITED STATES PATENT OFFICE 2,510,192

TIRE RELIEF VALVE

Ernest Payne, Denver, Colo.

Application December 29, 1945, Serial No. 638,033

3 Claims. (Cl. 137—69.5)

This invention relates to an automatic relief valve for pneumatic tire valves, and has for its principal object the provision of a valve which can be replaced with a conventional valve, and which will act to automatically relieve the tire of slow increases in air pressure in excess of a predetermined maximum.

Pressure relief valves have been designed for this purpose. These valves usually consist of a spring-loaded valve which will open and allow air to escape from the tire whenever the pressure therein exceeds a predetermined pressure, even when, due to the fact that tire pressures are subjected to temporary increases due to uneven loading, road conditions, and impacts. All of these conditions create momentary increases in the tire pressure and, if air is relieved at each of these momentary increases, the residual pressure in the tire will eventually descend below the predetermined operating point.

An object of this invention is to combine a governing valve with a relief valve so that the escaping air will be controlled so that it cannot be driven from the tire due to temporary and momentary increases in pressure.

A further object is to so construct the valve that it can be adjusted to act as simply a tire-filling valve if the relief feature is not desired, and so that it can be replaced by normal valve "insides" if desired.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is an enlarged longitudinal section through a pneumatic tire valve stem with the invention in place therein;

Fig. 2 is a still further enlarged fragmentary longitudinal section, illustrating the relief and governing valves employed in the invention;

Fig. 3 is a side elevation of the complete valve stem and cap, approximately natural size;

Figs. 4, 5, 6, and 7 are cross-sections through the valve of Fig. 1, taken on the lines 4—4, 5—5, 6—6, and 7—7, respectively; and Fig. 8 is a fragmentary detail longitudinal section, illustrating the pressure-adjusting nut employed in the valve.

The improved valve comprises a tubular valve stem 10 provided with oppositely-acting, wedge-shaped, spiral grooves 11 on its exterior by means of which the rubber nipple of the tire inner tube is secured in place thereon. The outer extremity of the valve stem 10 is externally threaded to receive a standard valve cap 12. The inside of the outer extremity of the stem 10 contains internal threads 13. From the threads 13 the interior extends to a tapered portion 15 from which a smaller tubular valve bore 16 extends. The bore 16 terminates in a shoulder 17, from which a smaller air channel 18 extends to the inner extremity of the stem 10.

A bushing 19 is threaded into the threads 13 and against the shoulder adjacent the bottom of the threads. The bushing 19 terminates in a flanged extremity 20 over which an internal flange on a valve body 21 is hooked. The flanged extremity 20 and the internal flange on the valve body 21 provide a swivel connection at this point which allows the bushing 19 to be rotated without rotating the valve body 21. The valve body is provided with a sealing gasket 22 which seats against the taper 15 of the stem to seal the body therein. The lower extremity of the body 21 is shaped to form an annular check valve seat 23. The bushing 19 and the body 21 contain a central bore through which a valve pin 24 passes, as is usual in tire valve constructions.

An annular, resilient check valve washer 25 is carried on the upper surface of a valve cage 26 and positioned to contact with and seal the check valve seat 23. The cage 26 is constantly urged upwardly so as to maintain the seal by means of a check valve spring 27 which is compressed between the bottom of the cage 26 and the shoulder 17 in the valve stem.

The construction thus far described provides the usual tire valve, that is, air entering the stem 10 flows downwardly around the pin 24 and forces the check valve washer 25 from the valve seat 23, allowing the air to enter and flow around the cage 26 into the tire. As soon as the external pressure is released, the spring 27 forces the washer 25 against the check valve seat 23 to prevent discharge of the air.

A valve disc 28 is formed on or otherwise secured to the pin 24 within the cage 26. The disc 28 terminates in a peripheral drum 29 which holds in place a resilient relief valve washer 30 and a resilient governing valve washer 31. The pin 24 is normally urged downwardly in the cage 26 by means of a pre-loaded spring 32 which is compressed between the bottom of the cage 26 and a pressure-adjusting nut 33 threaded on the lower extremity of the pin 24.

The action of the spring 32 in forcing the pin 24 downwardly serves to force the relief valve washer 30 against an annular relief valve seat 34 formed on and extending upwardly from the bottom of the cage 26. The governing valve washer 31 is formed with an annular counterbore 35 in its upper face, into which the lower extremity of a governing sleeve 36 fits. The sleeve 36 extends downwardly from the top of the valve cage 26 and fits snugly into the counterbore 35 but does not form an air-tight seal therewith.

The pressure between the relief valve washer 30 and its seat 34 can be increased or lessened by rotating the adjusting nut 33. The latter nut is provided with a cross bar 37 by means of which it may be conveniently rotated. A spring sleeve 38 is swivelled, as shown at 39, on the lower extremity of the cage 26 and serves to separate the springs 27 and 32 and to act as a guide for the nut 33. The walls of the sleeve are slotted, as shown at 40, to allow the air to pass therethrough.

Let us assume that the tire has been inadvertently inflated to a pressure in excess of that desired and in excess of the relief point at which the nut 33 is set. This excess pressure will act against the lower extremity of the pin 24 and against the lower face of the relief valve washer 30, causing it to lift the latter from its seat 34. The pin 24 moves upwardly with the relief valve washer 30 and carries the governing valve washer 31 upwardly about the sleeve 36, but since this is a snug but not an air-tight fit at this point, the air escaping past the valve seat 34 and into the cage 26 slowly exits between the governing valve washer 31 and the governing sleeve 36. In other words, this provides what might be termed a "slow leak" until the normal pressure is restored in the tire and the spring 32 again seals the valve 30 to the seat 34.

Short abrupt increases in pressure, as would occur when the tire strikes an obstruction such as a rock or a curb, force the valve 31 against the sleeve 36 to retard the escaping air until the tire pressure returns to normal. At no time does the governing valve entirely close, it simply retards the air flow proportionately to its degree of closing.

To deflate the tire it is only necessary to depress the pin 24, as is usual. This causes the disc 28 to force the relief valve washer 30 against its seat 34 and in turn forces the cage 26 downwardly to separate the check valve washer 25 from the valve seat 23.

When the valve is in use, the escaping pressure may be allowed to by-pass the cap 12 through a bleed port 41 formed therein. Should it not be desired to make use of the relief feature of the valve, the nut 33 can be tightened sufficiently to prevent the seat 30 from moving from the valve 34, and/or a sealing disc 42 can be inserted in the cap 12 to seal the port 41.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A relief valve for pneumatic tires comprising: a tubular valve stem; a bushing threaded into one extremity of said valve stem; a valve body carried by said bushing within said stem; a sealing gasket sealing said body to said stem; an annular valve seat on the inner extremity of said body; a valve pin extending through said bushing and through said body; a valve cage surrounding said pin; a check valve washer on the upper extremity of said cage closing said valve seat; spring means urging said cage outwardly to maintain said check valve washer against said seat; a valve disc secured to said pin within said cage; a relief valve washer on the inner face of said disc; an annular relief valve seat in said cage contacting said relief valve washer; a second spring means urging the inner extremity of said pin away from said cage to maintain said relief valve seat and its washer in contact; a resilient governing valve washer on the outer face of said disc; and a governing valve sleeve extending toward said governing valve washer from said cage and co-operating with said governing valve washer so that when the relief valve washer moves away from the relief valve seat, the governing valve washer will move toward the governing valve sleeve to control the flow of air from the relief valve.

2. A relief valve for pneumatic tires comprising: a tubular valve stem; a bushing threaded into one extremity of said valve stem; a valve body carried by said bushing within said stem; a sealing gasket sealing said body to said stem; an annular valve seat on the inner extremity of said body; a valve pin extending through said bushing and through said body; a valve cage surrounding said pin; a check valve washer on the upper extremity of said cage closing said valve seat; spring means urging said cage outwardly to maintain said check valve washer against said seat; a valve disc secured to said pin within said cage; a relief valve washer on the inner face of said disc; an annular relief valve seat in said cage contacting said relief valve washer; a second spring means urging the inner extremity of said pin away from said cage to maintain said relief valve seat and its washer in contact; a resilient governing valve washer on the outer face of said disc; a governing valve sleeve extending toward said governing valve washer from said cage and co-operating with said governing valve washer so that when the relief valve washer moves away from the relief valve seat, the governing valve washer will move toward the governing valve sleeve to control the flow of air from the relief valve; and means on said pin for adjusting the compression of said second spring means.

3. A relief valve for pneumatic tires comprising: a tubular valve stem; a bushing threaded into one extremity of said valve stem; a valve body carried by said bushing within said stem; a sealing gasket sealing said body to said stem; an annular valve seat on the inner extremity of said body; a valve pin extending through said bushing and through said body; a valve cage surrounding said pin; a check valve washer on the upper extremity of said cage closing said valve seat; spring means urging said cage outwardly to maintain said check valve washer against said seat; a valve disc secured to said pin within said cage; a relief valve washer on the inner face of said disc; an annular relief valve seat in said cage contacting said relief valve washer; a second spring means urging the inner extremity of said pin away from said cage to maintain said relief valve seat and its washer in contact; a resilient governing valve washer on the outer face of said disc; a governing valve sleeve extending toward said governing valve washer from said cage and co-operating with said governing valve washer so that when the relief valve washer moves away from the relief valve seat, the governing valve washer will move toward the governing valve sleeve to control the flow of air from the relief valve; means on said pin for adjusting the compression of said second spring means; and a spring sleeve swivelled to said valve cage and extending inwardly into said stem between the two spring means.

ERNEST PAYNE.

REFERENCES CITED

The following references are of record in the file of this patent:

UNITED STATES PATENTS

| Number | Name | Date |
|---|---|---|
| 1,172,477 | Mizender | Feb. 22, 1916 |
| 1,250,503 | Ray | Dec. 18, 1917 |
| 1,917,499 | Conrad | July 11, 1933 |
| 1,933,454 | Sidney | Oct. 31, 1933 |
| 1,934,572 | Sutton | Nov. 7, 1933 |
| 2,254,655 | Hollowell | Sept. 2, 1941 |